(12) United States Patent
Shimizu et al.

(10) Patent No.: US 12,410,651 B2
(45) Date of Patent: Sep. 9, 2025

(54) WINDOW REGULATOR

(71) Applicant: Johnan Manufacturing Inc., Ueda (JP)

(72) Inventors: Hiroki Shimizu, Ueda (JP); Syugo Tanaka, Ueda (JP)

(73) Assignee: Johnan Manufacturing Inc., Ueda (JP)

( * ) Notice: Subject to any disclaimer, the term of this patent is extended or adjusted under 35 U.S.C. 154(b) by 0 days.

(21) Appl. No.: 18/742,030

(22) Filed: Jun. 13, 2024

(65) Prior Publication Data

US 2024/0426158 A1    Dec. 26, 2024

(30) Foreign Application Priority Data

Jun. 26, 2023    (JP) .................... 2023-104457

(51) Int. Cl.
*B60J 5/04*     (2006.01)
*E05F 15/689*   (2015.01)

(52) U.S. Cl.
CPC ....... *E05F 15/6914* (2024.01); *E05Y 2201/11* (2013.01); *E05Y 2900/55* (2013.01)

(58) Field of Classification Search
CPC ............. E05F 15/6914; E05Y 2201/11; E05Y 2900/55
USPC .................................... 49/348, 349
See application file for complete search history.

(56) References Cited

U.S. PATENT DOCUMENTS

| | | | | |
|---|---|---|---|---|
| 4,471,251 A | * | 9/1984 | Yamashita | B60J 5/0405 310/91 |
| 4,728,143 A | * | 3/1988 | Tanino | B60R 13/0243 296/146.7 |
| 4,766,697 A | * | 8/1988 | Boileau | B60J 1/17 49/352 |
| 4,890,376 A | * | 1/1990 | Boileau | B60J 1/17 29/434 |
| 4,905,860 A | * | 3/1990 | Kurihara | H04R 1/025 220/675 |
| 4,937,977 A | * | 7/1990 | Gergoe | B60J 1/17 49/352 |
| 5,050,347 A | * | 9/1991 | Brusasco | B60J 5/0416 49/502 |
| 5,050,350 A | * | 9/1991 | Bertolini | B60J 5/0416 49/502 |
| 5,062,240 A | * | 11/1991 | Brusasco | B60J 5/0416 296/153 |
| 5,095,659 A | * | 3/1992 | Benoit | B60J 5/0416 292/DIG. 31 |
| 5,251,403 A | * | 10/1993 | Compeau | B60J 5/0416 49/502 |

(Continued)

FOREIGN PATENT DOCUMENTS

| | | | | | |
|---|---|---|---|---|---|
| CN | 116771232 A | * | 9/2023 | ............ | E05F 11/483 |
| EP | 1090788 A1 | * | 4/2001 | ............ | B60J 5/0416 |

(Continued)

*Primary Examiner* — Jason W San
(74) *Attorney, Agent, or Firm* — Calderon Safran & Wright P.C.; David S. Safran

(57) ABSTRACT

A window regulator installed on a door panel of a vehicle door. The window regulator includes a carrier plate that supports a window glass of the vehicle door, a guide rail that supports the carrier plate in an ascendable and descendible manner, a housing including a rail fitting portion to which an end portion of the guide rail is fitted, and a cover plate that closes a working hole of the door panel. The housing and the cover plate are integrally molded.

3 Claims, 5 Drawing Sheets

(56) References Cited

U.S. PATENT DOCUMENTS

| | | | | |
|---|---|---|---|---|
| 5,379,553 | A * | 1/1995 | Kimura | B60J 5/0416 49/502 |
| 5,715,630 | A * | 2/1998 | Szerdahelyi | E05F 11/445 49/351 |
| 5,904,002 | A * | 5/1999 | Emerling | B60J 5/0418 49/502 |
| 5,927,020 | A * | 7/1999 | Kobrehel | B60J 5/0416 49/502 |
| 5,931,682 | A * | 8/1999 | Takiguchi | H05K 3/326 439/246 |
| 5,979,115 | A * | 11/1999 | Szerdahelyi | B60J 5/0416 296/146.7 |
| 6,076,882 | A * | 6/2000 | Szerdahelyi | B60R 21/21 296/146.7 |
| 6,367,202 | B1 * | 4/2002 | Reed | B60R 13/0243 381/86 |
| 6,453,615 | B1 * | 9/2002 | Berta | B60J 5/0416 49/502 |
| 6,594,955 | B1 * | 7/2003 | Delire | B60J 5/0416 49/502 |
| 6,615,546 | B2 * | 9/2003 | Furuyama | B60R 13/02 296/146.7 |
| 6,616,216 | B2 * | 9/2003 | Furuyama | B60J 5/0416 296/146.7 |
| 6,892,496 | B1 * | 5/2005 | Youngs | B60J 5/0416 49/502 |
| 6,983,978 | B2 * | 1/2006 | Radu | B60R 13/0243 296/146.7 |
| 7,347,026 | B1 * | 3/2008 | Garcia Martin | B60R 11/02 296/146.7 |
| 7,364,218 | B2 * | 4/2008 | Radu | B29C 45/1676 296/146.7 |
| 8,065,837 | B2 * | 11/2011 | Nakajima | B60J 5/0416 49/502 |
| 8,776,438 | B2 * | 7/2014 | Pleiss | E05F 11/382 49/502 |
| 9,255,432 | B2 | 2/2016 | Imaoka | |
| 11,313,166 | B2 * | 4/2022 | Kalb | E05F 15/697 |
| 2006/0130405 | A1 * | 6/2006 | Hemond | E05F 15/697 49/352 |
| 2013/0152714 | A1 | 6/2013 | Imaoka | |
| 2013/0318876 | A1 * | 12/2013 | Takakura | E05F 11/385 49/506 |
| 2020/0256104 | A1 * | 8/2020 | Kashiwagi | E05F 11/486 |

FOREIGN PATENT DOCUMENTS

| | | | | |
|---|---|---|---|---|
| EP | 1170452 A1 * | 1/2002 | | E05F 11/483 |
| JP | 2013-124515 A | 6/2013 | | |

* cited by examiner

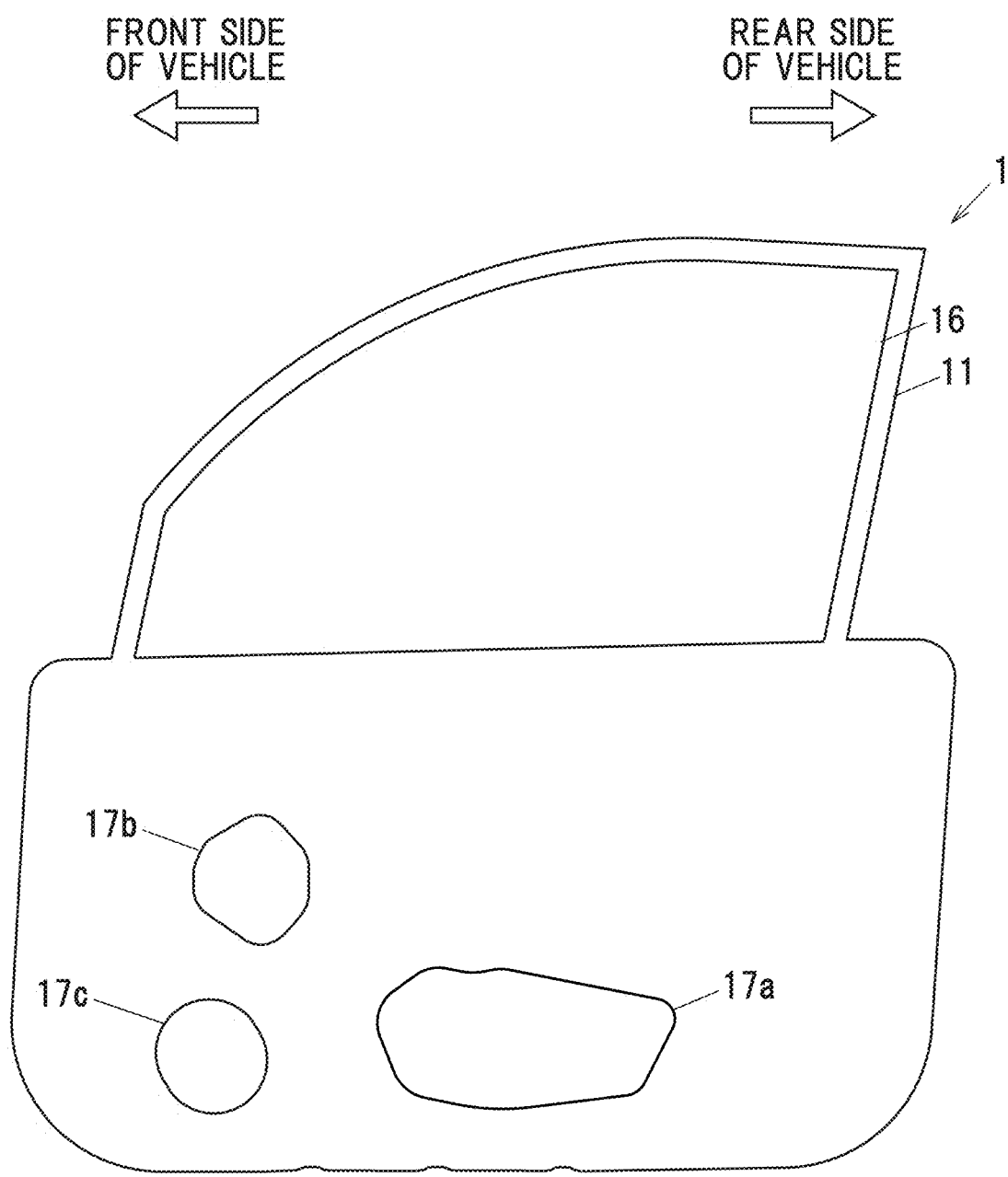

WINDOW REGULATOR

CROSS-REFERENCE TO RELATED APPLICATIONS

The present patent application claims the priority of Japanese patent application No. 2023/104457 filed on Jun. 26, 2023, and the entire contents of Japanese patent application No. 2023/104457 are hereby incorporated by reference.

TECHNICAL FIELD

The present invention relates to a window regulator.

BACKGROUND ART

A lower end drive-type window regulator is known which has a drive unit arranged at a lower end of a guide rail (see Patent Literature 1). The window regulator includes a carrier plate connected to a window glass of a vehicle, a guide rail to guide ascending and descending of the carrier plate, a wire to pull the carrier plate, a rotating drum that takes up and feeds out the wire by rotating, and a drum housing (casing) to which the lower end of the guide rail is attached and in which the rotating drum is housed. This type of window regulator is configured such that the drum housing with the guide rail attached thereto is attached to the door panel and the window regulator is thereby installed on the door panel.

CITATION LIST

Patent Literatures

Patent Literature 1: JP 2013/124515A

SUMMARY OF INVENTION

However, the known window regulator cannot be installed on the door panel if a working hole (service hole) of the door panel is located at the position of the drum housing. Therefore, it is necessary to install the window regulator so that the position of the drum housing does not overlap with the position of the working hole, which poses a problem in that the position of the window regulator with respect to the door panel is restricted.

It is an object of the invention to provide a window regulator that can be installed with a simple configuration and without being restricted by the working hole.

According to an aspect of the invention, provided is a window regulator installed on a door panel of a vehicle door, the window regulator comprising:
- a carrier plate that supports a window glass of the vehicle door;
- a guide rail that supports the carrier plate in an ascendable and descendible manner;
- a housing comprising a rail fitting portion to which an end portion of the guide rail is fitted; and
- a cover plate that closes a working hole of the door panel,
wherein the housing and the cover plate are integrally molded.

Advantageous Effects of Invention

The window regulator according to the aspect of the invention can be installed with the simple configuration and without being restricted by the working hole.

BRIEF DESCRIPTION OF DRAWINGS

FIG. 2 is a front view showing the vehicle door.

DESCRIPTION OF EMBODIMENTS

A window regulator in an embodiment of the invention will be described below with reference to the appended drawings. The window regulator is a raising/lowering device that is installed in a vehicle door and raises/lowers a window glass on the vehicle door. In particular, the drum housing and the cover plate of this window regulator are molded integrally, allowing the wind regulator to be installed without being restricted by a working hole. Hereinafter, an ascending/descending direction of the window glass will be simply referred to as the ascending/descending direction. In addition, left, right, front, rear, up and down used in the following description are as defined in each drawing. In the present embodiment, the ascending/descending direction coincides with the up-down direction of the window regulator, and a vehicle width direction coincides with a front-rear direction of the window regulator. In addition, a direction orthogonal to the ascending/descending direction and the vehicle width direction is a left-right direction of the window regulator.

(Configuration of a Vehicle Door)

Figure 1:
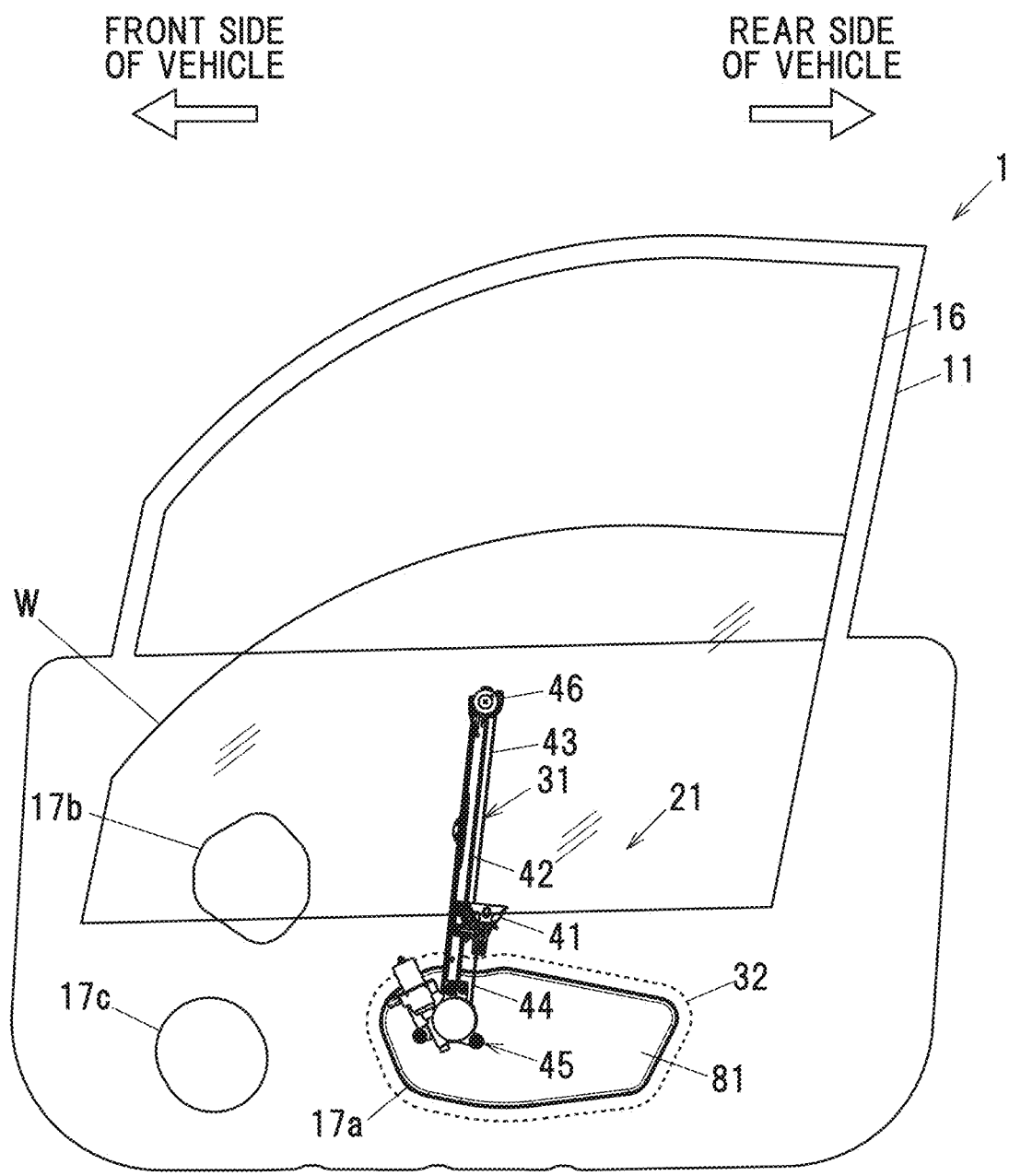
FIG. 1 is a schematic front view showing a window regulator in an embodiment of the present invention and a vehicle door in which the window regulator is installed.

Here, before describing a window regulator 21, a vehicle door 1 in which the window regulator 21 is installed will be described. As shown in FIGS. 1 and 2, the vehicle door 1 is composed of an inner panel 11 as a door panel on the interior side of the vehicle and an outer panel (not shown) on the exterior side of the vehicle, and a door internal space is formed between the inner panel 11 and the outer panel.

A window opening 16, which is opened and closed by a window glass W, is formed on upper portions of the inner panel 11 and the outer panel. Then, three working holes 17a, 17b and 17c to introduce various functional components into the door internal space are formed on a lower portion of the inner panel 11. Hereinafter, the working hole 17a to introducing the window regulator 21 into the door internal space will be referred to as the "first working hole".

(Configuration of the Window Regulator)

Figure 3A:
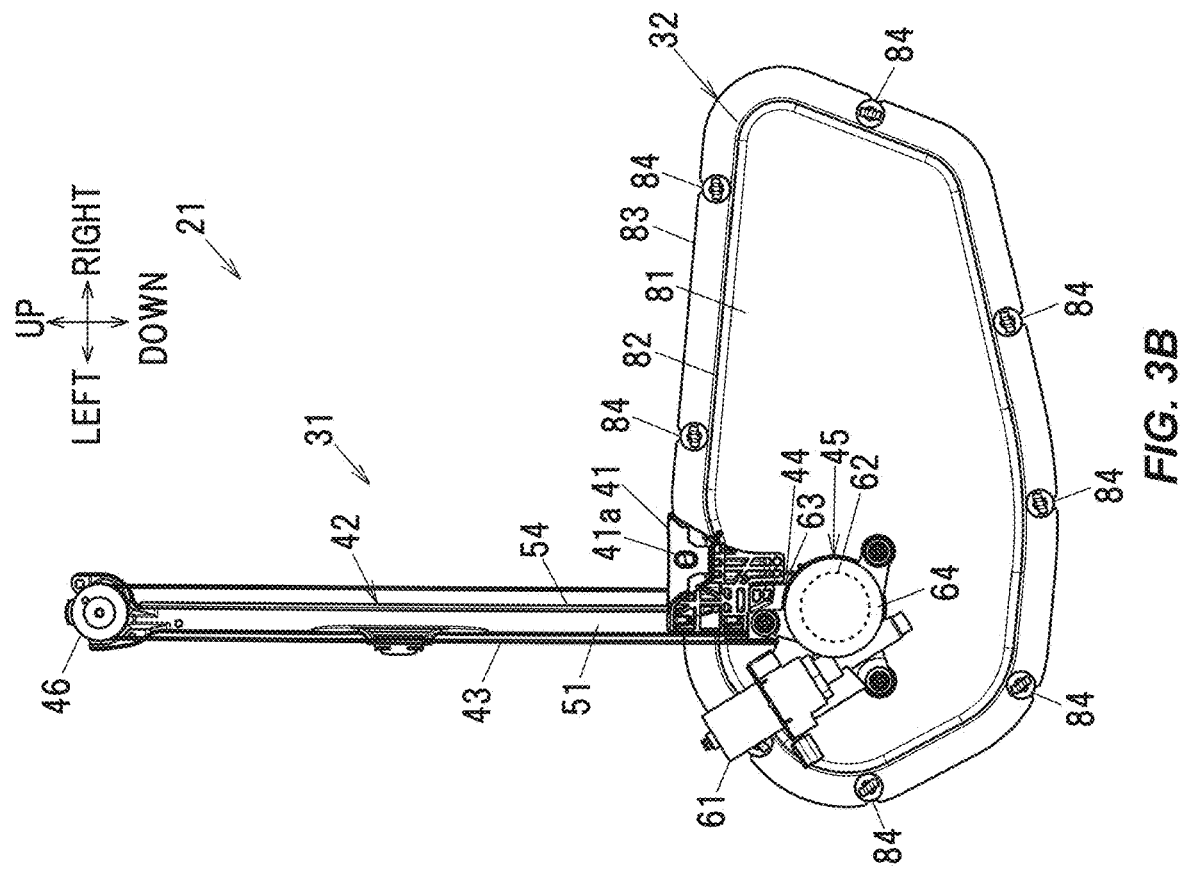
FIG. 3A is a front view showing the window regulator when a window glass is fully closed.
Figure 3B:
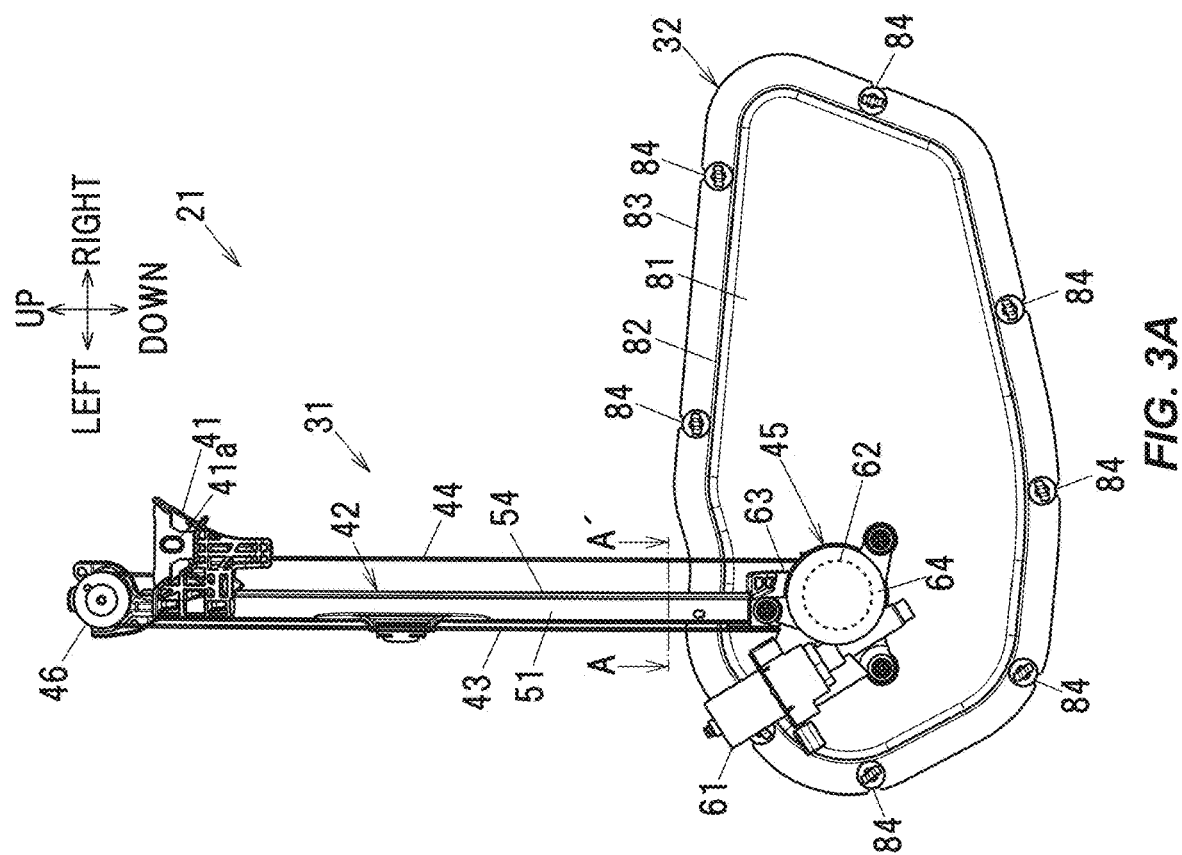
FIG. 3B is a front view showing the window regulator when the window glass is fully open.

As shown in FIGS. 1, 3A and 3B, the window regulator 21 is installed on the inner panel 11 of the vehicle door 1, and includes a window regulator main body 31, and cover plate 32 that supports the window regulator main body 31 and closes the first working hole 17*a*.

As shown in FIGS. 3A and 3B, the window regulator main body 31 includes a carrier plate 41 that supports the window glass W, a guide rail 42 that is provided along the ascending/descending direction and supports the carrier plate 41 in an ascendable and descendible manner, an ascending-side wire 43 and a descending-side wire 44 that pull the carrier plate 41, a drive unit 45 arranged at a lower end of the guide rail 42 to drive the ascending-side wire 43 and the descending-side wire 44, and a pulley 46 fixed to an upper end of the guide rail 42 to change the direction of the ascending-side wire 43. That is, the window regulator main body 31 is a wire driving-type window regulator to raise and lower the carrier plate 41 using the wires 43, 44 and is also a lower end drive-type window regulator having the drive unit 45 arranged at the lower end of the guide rail 42. The ascending-side wire 43 and the descending-side wire 44 are examples of the wire.

Figure 4A:
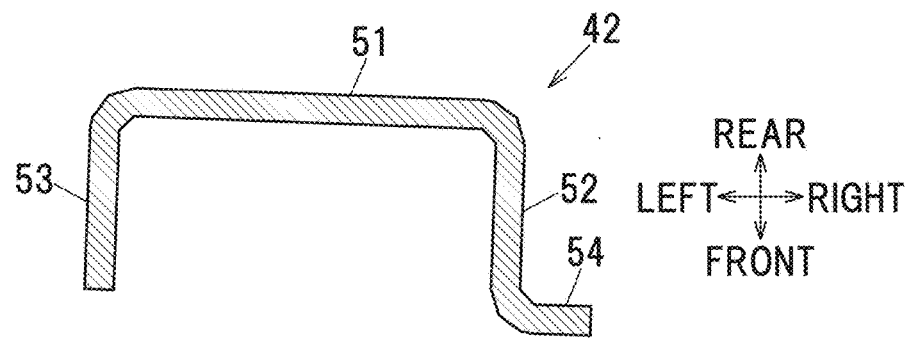
FIG. 4A is a cross-sectional view taken along line A-A' and showing a guide rail as shown in FIG. 3A.

The guide rail 42 is a long metal member extending along the ascending/descending direction and is curved so as to bulge in the vehicle width direction toward the outside of a vehicle cabin. As shown in FIG. 4A, the guide rail 42 has a flat plate portion 51 extending in the ascending/descending direction, a right-side plate portion 52 and a left-side plate portion 53 that rise toward the front from left and right ends of the flat plate portion 51 that are ends in a lateral direction (a direction perpendicular to the ascending/descending direction), and a right flange portion 54 protruding to the right from a front end of the right-side plate portion 52.

As shown in FIGS. 3A and 3B, the ascending-side wire 43 is connected at one end to a rotating drum 62 (described later) of the drive unit 45, is fed upward from the drive unit 45 to the pulley 46, is redirected downward by the pulley 46, and is then attached at the other end to the carrier plate 41. On the other hand, the descending-side wire 44 is connected at one end to the rotating drum 62 of the drive unit 45, is fed upward from the drive unit 45, and is attached at the other end to the carrier plate 41.

The carrier plate 41 is a plate-shaped member formed of, e.g., a resin such as polyacetal, and is slidably supported by the right-side plate portion 52 of the guide rail 42. The carrier plate 41 also has a fastening hole 41*a* for attachment of the window glass W. The fastening hole 41*a* is for bolt-fastening of a glass holder (not shown) which is fixed to the window glass W. The glass holder is attached to the fastening hole 41*a* with a bolt, and the window glass W is thereby attached to the carrier plate 41 through the glass holder.

The drive unit 45 has a drive motor 61, the cylindrical rotating drum 62 that is rotationally driven by the drive motor 61 and takes up and feeds out (drives) the ascending-side wire 43 and the descending-side wire 44 by rotating, a reducer (not shown) to transfer rotation of the drive motor 61 to the rotating drum 62, a drum housing 63 to which the lower end of the guide rail 42 is fitted and in which the rotating drum 62 is rotatably housed, and a motor housing 64 holding the drive motor 61. The motor housing 64 incorporates the reducer and is fixed to the drum housing 63. The motor housing 64 covers an opening of a drum housing portion 71 (described later) of the drum housing 63 in a state in which an output shaft of the reducer is connected to the rotating drum 62. The drum housing 63 is an example of the housing.

When the drive motor 61 is driven forward, the rotating drum 62 rotates forward and takes up the ascending-side wire 43 while feeding out the descending-side wire 44. Thus, the carrier plate 41 is pulled by the ascending-side wire 43 and moves upward in the ascending/descending direction. As a result, the window glass W attached to the carrier plate 41 ascends. On the other hand, when the drive motor 61 is driven reverse, the rotating drum 62 rotates reverse and takes up the descending-side wire 44 while feeding out the ascending-side wire 43. Thus, the carrier plate 41 is pulled by the descending-side wire 44 and moves downward in the ascending/descending direction. As a result, the window glass W attached to the carrier plate 41 descends. In this manner, the carrier plate 41 and the window glass W are raised and lowered along the guide rail 41.

Figure 5A:
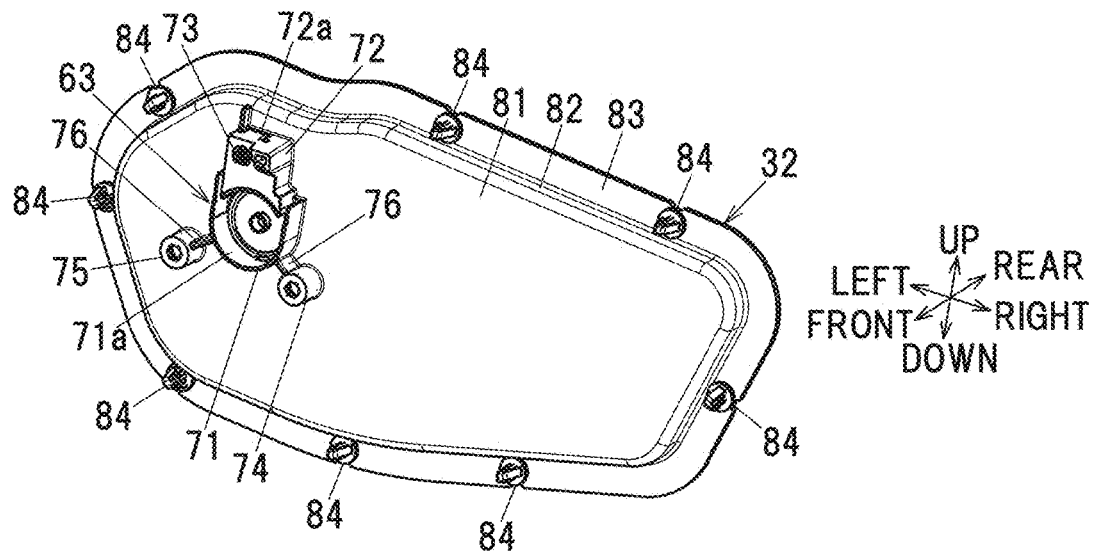
FIG. 5A is a perspective view showing a drum housing and a cover plate that are integrally molded.
Figure 5B:
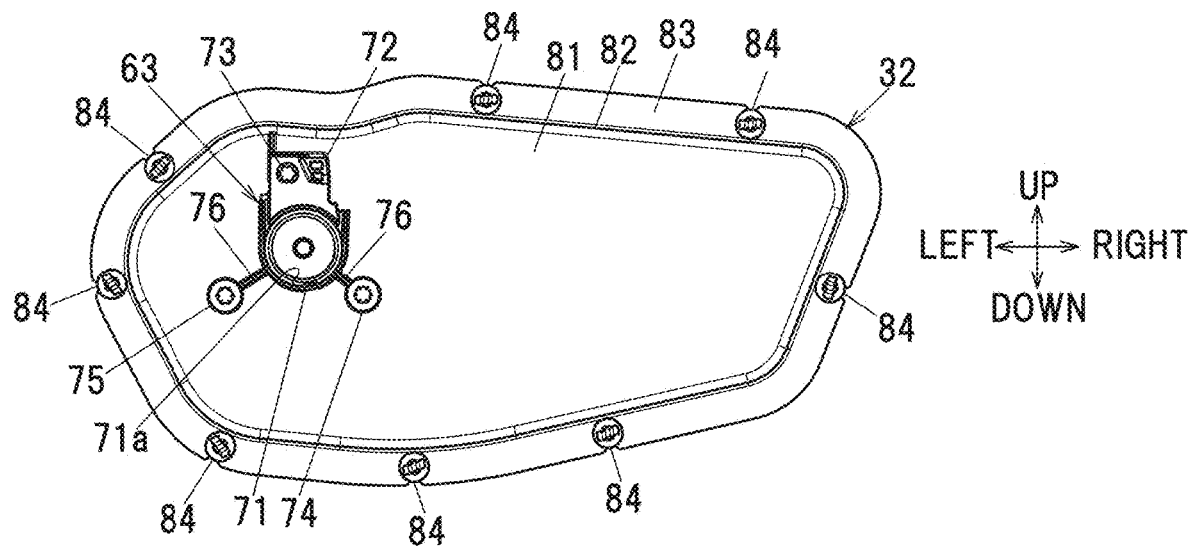
FIG. 5B is a front view showing the drum housing and the cover plate that are integrally molded.
Figure 5C:
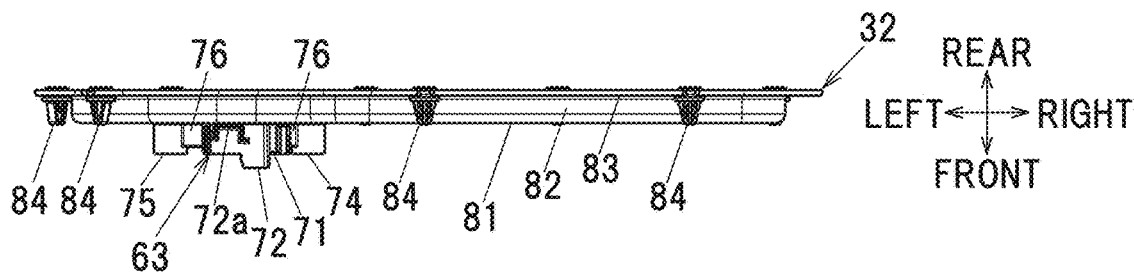
FIG. 5C is a plan view showing the drum housing and the cover plate that are integrally molded.

As shown in FIGS. 5A to 5C, the drum housing 63 is formed of a resin such as polyacetal and is integrally molded with the cover plate 32. The drum housing 63 has the drum housing portion 71 having a housing hole 71*a* in which the rotating drum 62 is rotatably housed, a rail fitting portion 72 arranged above the drum housing portion 71 and fitted with the lower end of the guide rail 42, and a first fixing portion 73, a second fixing portion 74 and a third fixing portion 75 for fixing the motor housing 64 with screws. The first fixing portion 73 is formed on the rail fitting portion 72, and the second fixing portion 74 and the third fixing portion 75 are respectively arranged at the lower right and lower left of the drum housing portion 71 and are connected to the drum housing portion 71 through rib-shaped connecting portions 76.

Figure 4B:
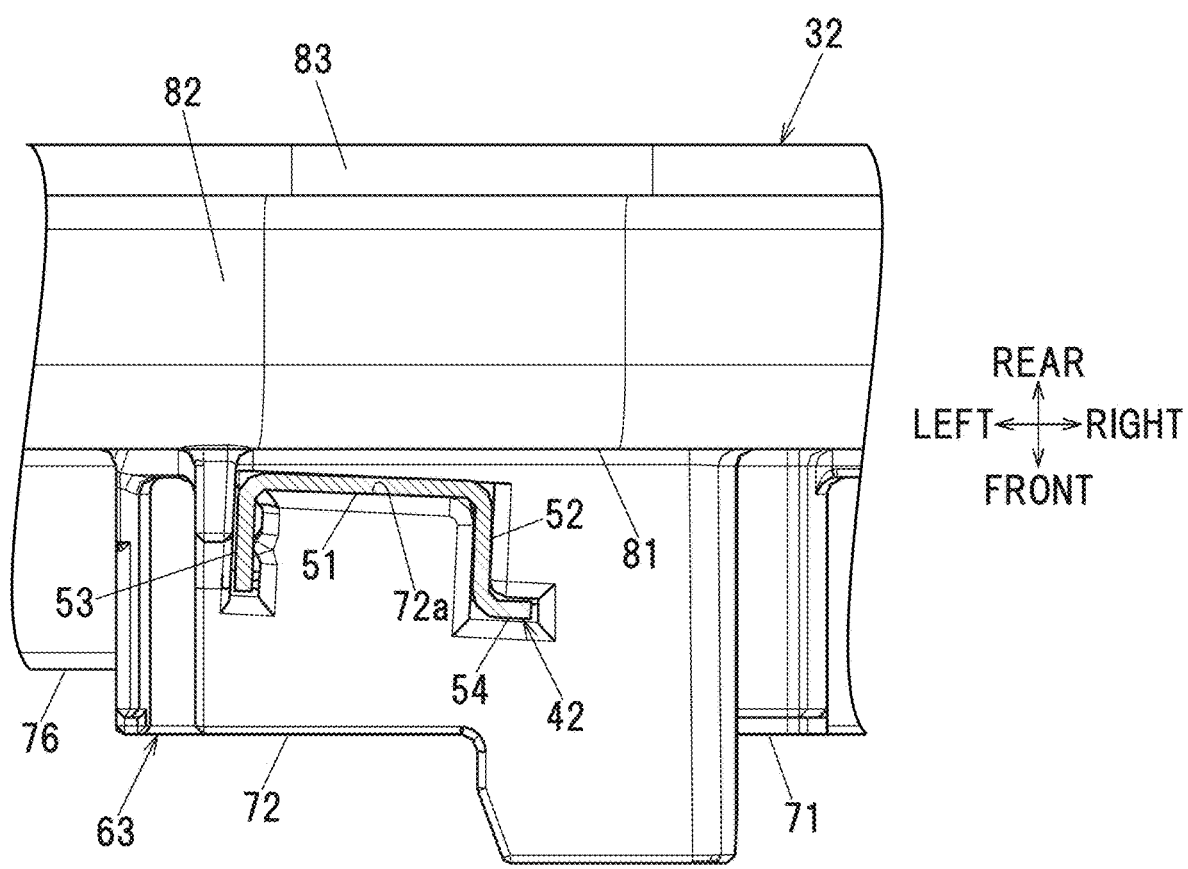
FIG. 4B is a cross-sectional view taken along line A-A' and showing the area around a rail fitting portion as shown in FIG. 3A.

The rail fitting portion 72 has a fitting hole 72*a* which is open on the upper side and into which the lower end of the guide rail 42 is inserted from above. As shown in FIG. 4B, the fitting hole 72*a* has a shape complementary to the cross section of the guide rail 42, and when the lower end of the guide rail 42 is inserted into the fitting hole 72*a*, inner walls of the fitting hole 72*a* facing the front and back surfaces (on the front and rear sides) of the flat plate portion 51 come into contact with the front and back surfaces of the flat plate portion 51 and the flat plate portion 51 is sandwiched and held in between, and also inner walls of the fitting hole 72*a* facing the front and back surfaces (on the left and right sides) of the left-side plate portion 53 come into contact with the front and back surfaces of the left-side plate portion 53 and the left-side plate portion 53 is sandwiched and held in between. The lower end of the guide rail 42 is thereby fitted into the fitting hole 72*a* and fixed. As a result, the lower end of the guide rail 42 is fixed to the drum housing 63.

As shown in FIGS. 5A to 5C, the cover plate 32 is formed of a resin such as polyacetal and integrally has a flat plate main body 81, a rising portion 82 rising rearward from a circumferential end portion of the plate main body 81, and a projecting portion 83 that projects outward (toward the side opposite to the plate main body 81) from an end of the rising portion 82. The plate main body 81 has the same shape as the first working hole 17*a*, and a raised portion composed of the plate main body 81 and the rising portion 82 is fitted to the first working hole 17*a*. Meanwhile, eight clips 84 for fastening to the inner panel 11 are attached to the projecting portion 83. The cover plate 32 is attached to the inner panel 11 by fastening the projecting portion 83 to the inner panel 11 with the eight clips 84 while fitting the plate main body 81 and the rising portion 82 to the first working hole 17*a*.

Although not shown in the drawings, a sealant for sealing is applied between the projecting portion 83 and the inner panel 11. This sealant improves the watertightness between the projecting portion 83 and the inner panel 11 and prevents water from entering the inside of the vehicle door through a gap between the cover plate 32 and the inner panel 11. In this window regulator 21, the cover plate 32, which is integrally molded with the drum housing 63, has this sealant.

As described above, the cover plate 32 and the drum housing 63 are integrally molded. In particular, the cover plate 32 and the drum housing 63 are integrally formed by molding a resin such as polyacetal. The drum housing 63 is molded on the front of the plate main body 81, and the drum housing 63 is thereby fixed to the plate main body 81.

(Operation of Installing the Window Regulator 21)

Next, an operation of installing the window regulator 21 on the vehicle door 1 will be described. In the operation of installing the window regulator 21, first, the window regulator main body 31 is introduced into the door internal space through the first working hole 17a. After that, the projecting portion 83 of the cover plate 32 is fastened to the inner panel 11 using the eight clips 84 while fitting the plate main body 81 and the rising portion 82 of the cover plate 32 to the first working hole 17a. After fastening the projecting portion 83 to the inner panel 11, the upper end of the window regulator main body 31 is fixed to the inner panel 11. Then, the operation of installing the window regulator 21 ends.

(Functions and Effects of the Embodiment)

In the configuration of the embodiment described above, integrally molding the drum housing 63 and the cover plate 32 allows the window regulator 21 to be installed on the inner panel 11 with a simple configuration without being restricted by the working hole 17a.

In addition, integrally molding the drum housing 63 and the cover plate 32 also eliminates the need for use of special fastening members (bolts and nuts, etc.) to fix the drum housing 63 to the cover plate 32 and also eliminates the need work of attaching the drum housing 63 to the cover plate 32, hence, the manufacturing cost of the window regulator 21 can be reduced.

In addition, integrally molding the drum housing 63 and the cover plate 32 also allows the fastening point of the drum housing 63 to the inner panel 11 to be away from the rail fitting portion 72. That is, since the drum housing 63 and the cover plate 32 are integrally molded, the drum housing 63 is fastened to the inner panel 11 though the cover plate 32, hence, the fastening point of the cover plate 32 to the inner panel 11 serves as the fastening point of the drum housing 63 to the inner panel 11. Thus, the fastening point of the drum housing 63 to the inner panel 11 can be away from the rail fitting portion 72. Therefore, it is possible to reduce the stress applied to the fastening point when moment with respect to the guide rail 42 or the rail fitting portion 72 as a fulcrum occurs. As a result, damage or breakage of the drum housing 63 or the inner panel 11 can be suppressed when moment with respect to the guide rail 42 or the rail fitting portion 72 as a fulcrum occurs due to rattling of the window glass W, etc. Furthermore, since the number of fastening points can be increased as compared to when the drum housing 63 is directly fastened to the inner panel 11, the stress applied can be dispersed to each fastening point and the load applied to each fastening point can be reduced.

Furthermore, instead of integrally molding the guide rail 42 directly with the cover plate 32, the drum housing 63, to which the lower end of the guide rail 42 is fitted, is integrally molded with the cover plate 32, hence, it is possible to replace the guide rail 42 with one having a different curvature or length. Thus, appropriately replacing the guide rail 42 with one having a different curvature or length allows to be compatible with the vehicle door 1 having a different curvature or size. That is, the same components except the guide rail 42 can be used for vehicle doors 1 having different curvatures or sizes, thereby reducing the manufacturing cost of the window regulator 21.

In addition, since the drum housing portion 71 and the rail fitting portion 72 are formed on the drum housing 63, the positional accuracy regarding the positional relationship (the relative positions) of the drum housing portion 71 and the rail fitting portion 72 can be improved.

Other Embodiments

Although the embodiment of the invention has been described, the invention according to claims is not limited to the embodiment described above. Further, please note that not all combinations of the features described in the embodiment are necessary to solve the problem of the invention. The invention can be appropriately modified and implemented without departing from the gist thereof.

For example, in the embodiment described above, the invention is applied to the drum housing 63 with the drum housing portion 71 formed thereon. However, it is not limited thereto. That is, the invention may be applied to a housing that has the rail fitting portion 72 but does not have the drum housing portion 71.

In addition, in the embodiment described above, the drive motor 61 is arranged on the front side of the inner panel 11 (on the exterior side of the vehicle). However, the drive motor 61 may be arranged on the rear side of the inner panel 11 (on the interior side of the vehicle).

In addition, in the embodiment described above, the invention is applied to the housing arranged at the lower end of the guide rail 42. However, the invention may be applied to a housing arranged at the upper end of guide rail 42. That is, the invention may be applied to a housing on which the rail fitting portion 72 fitted with the upper end of the guide rail 42 is formed.

In addition, in the embodiment described above, the invention is applied to the single-rail window regulator 21 with a single guide rail 42. However, the invention may be applied to a double-rail window regulator 21 with plural guide rails 42, etc.

In addition, in the embodiment described above, the invention is applied to the lower end drive-type window regulator 21. However, the invention may be applied to other window regulators having the drive unit 45 at different positions, such as delta-type, banjo-type, or self-propelled type.

In addition, in the embodiment described above, the window regulator 21 installed in the left front door (i.e., the left front side door) has been described as an example. However, it is not limited thereto. That is, the invention may be applied to the window regulator 21 installed in the right side door, or the invention may be applied to the window regulator 21 installed in the rear side door.

REFERENCE SIGNS LIST

1 VEHICLE DOOR
11 INNER PANEL
17a WORKING HOLE
21 WINDOW REGULATOR
32 COVER PLATE
41 CARRIER PLATE
42 GUIDE RAIL
43 ASCENDING-SIDE WIRE
44 DESCENDING-SIDE WIRE
62 ROTATING DRUM

63 DRUM HOUSING
71 DRUM HOUSING PORTION
72 RAIL FITTING PORTION
W WINDOW GLASS

The invention claimed is:

1. A window regulator installed on a door panel of a vehicle door, the window regulator comprising:
   a carrier plate that supports a window glass of the vehicle door;
   a guide rail that supports the carrier plate in an ascendable and descendible manner;
   a housing comprising a rail fitting portion to which an end portion of the guide rail is fitted; and
   a cover plate that is attached to the door panel and closes a working hole formed in the door panel,
   wherein the housing and the cover plate are integrally molded, and
   wherein the housing is attached to the door panel through the cover plate.

2. The window regulator according to claim 1, further comprising:
   a wire to pull the carrier plate; and
   a rotating drum that drives the wire by rotating,
   wherein the housing further comprises a drum housing portion to house the rotating drum.

3. The window regulator according to claim 1, wherein the housing and the cover plate are integrally formed by molding a resin.

* * * * *